(12) United States Patent
Richard et al.

(10) Patent No.: US 8,520,995 B2
(45) Date of Patent: Aug. 27, 2013

(54) SINGLE-MODE OPTICAL FIBER

(75) Inventors: Simon Richard, Villebon sur Yvette (FR); Louis-Anne de Montmorillon, Versailles (FR); Pierre Sillard, Le Chesnay (FR); Marianne Bigot-Astruc, Marcouseis (FR); Denis Molin, Draveil (FR)

(73) Assignee: Draka Comteq, B.V., Amsterdam (NL)

( * ) Notice: Subject to any disclaimer, the term of this patent is extended or adjusted under 35 U.S.C. 154(b) by 591 days.

(21) Appl. No.: 12/692,161

(22) Filed: Jan. 22, 2010

(65) Prior Publication Data

US 2010/0189397 A1   Jul. 29, 2010

Related U.S. Application Data

(60) Provisional application No. 61/154,538, filed on Feb. 23, 2009.

(30) Foreign Application Priority Data

Jan. 23, 2009   (FR) ...................................... 09 00299

(51) Int. Cl.
*G02B 6/032* (2006.01)
(52) U.S. Cl.
USPC .......................................................... 385/135
(58) Field of Classification Search
USPC .......................................................... 385/135
See application file for complete search history.

(56) References Cited

U.S. PATENT DOCUMENTS

| | | | |
|---|---|---|---|
| 4,838,643 A | 6/1989 | Hodges et al. |
| 5,044,724 A | 9/1991 | Glodis et al. |
| 5,574,816 A | 11/1996 | Yang et al. |
| 5,717,805 A | 2/1998 | Stulpin |
| 5,761,362 A | 6/1998 | Yang et al. |
| 5,907,652 A | 5/1999 | DiGiovanni et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,097,870 A | 8/2000 | Ranka et al. |
| 6,134,363 A | 10/2000 | Hinson et al. |

(Continued)

FOREIGN PATENT DOCUMENTS

| | | |
|---|---|---|
| EP | 0905834 A2 | 3/1999 |
| EP | 1279978 A1 | 1/2003 |

(Continued)

OTHER PUBLICATIONS

Nakajima et al., "Hole-Assisted Fiber Design for Small Bending and Splice Losses", IEEE Photonics Technology Letters, vol. 15, No. 12, pp. 1737-1739, Dec. 2003.

(Continued)

*Primary Examiner* — Omar Rojas
(74) *Attorney, Agent, or Firm* — Summa, Additon & Ashe, P.A.

(57) ABSTRACT

An optical fiber includes a central core, which has a radius $r_1$ and a refractive index $n_1$, and a surrounding optical cladding, which has a refractive index $n_2$ such that $n_2 < n_1$ and $0.31\% < ((n_1-n_2) \div n_2) < 0.55\%$. The optical cladding has at least five holes. These holes, which are positioned between about 9 microns and 17 microns from the central core, have a radius $r_h$ such that $0.5 r_1 \leq r_h \leq r_1$.

40 Claims, 1 Drawing Sheet

(56) References Cited

U.S. PATENT DOCUMENTS

| | | |
|---|---|---|
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,118 B1 * | 10/2002 | Uno .................................. 385/49 |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,636,677 B2 | 10/2003 | Hasegawa et al. |
| 6,658,184 B2 | 12/2003 | Bourget et al. |
| 6,749,446 B2 | 6/2004 | Nechitailo |
| 6,901,197 B2 | 5/2005 | Hasegawa et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,043,127 B2 | 5/2006 | Hasegawa et al. |
| 7,045,010 B2 | 5/2006 | Sturman, Jr. |
| 7,095,940 B2 | 8/2006 | Hayami et al. |
| 7,162,128 B2 | 1/2007 | Lovie et al. |
| 7,164,835 B2 | 1/2007 | Matsuo et al. |
| 7,228,040 B2 | 6/2007 | Nakajima et al. |
| 7,239,784 B2 | 7/2007 | Hayami et al. |
| 7,292,762 B2 | 11/2007 | Guan et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,433,566 B2 | 10/2008 | Bookbinder et al. |
| 7,444,838 B2 | 11/2008 | Pickrell et al. |
| 7,450,806 B2 | 11/2008 | Bookbinder et al. |
| 7,450,807 B2 | 11/2008 | Bickham et al. |
| 7,483,613 B2 | 1/2009 | Bigot-Astruc et al. |
| 7,515,795 B2 | 4/2009 | Overton et al. |
| 7,526,166 B2 | 4/2009 | Bookbinder et al. |
| 7,526,169 B2 | 4/2009 | Bickham et al. |
| 7,529,453 B2 * | 5/2009 | Miyabe et al. ................. 385/125 |
| 7,555,186 B2 | 6/2009 | Flammer et al. |
| 7,555,187 B2 | 6/2009 | Bickham et al. |
| 7,567,739 B2 | 7/2009 | Overton et al. |
| 7,567,742 B2 | 7/2009 | Pickrell et al. |
| 7,570,852 B2 | 8/2009 | Nothofer et al. |
| 7,574,088 B2 | 8/2009 | Sugizaki et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,817,891 B2 | 10/2010 | Lavenne et al. |
| 2006/0024009 A1 | 2/2006 | Kubota et al. |
| 2006/0045448 A1 | 3/2006 | Nakajima et al. |
| 2007/0147756 A1 | 6/2007 | Matsuo et al. |
| 2008/0056654 A1 | 3/2008 | Bickham et al. |
| 2008/0166094 A1 | 7/2008 | Bookbinder et al. |
| 2008/0292262 A1 | 11/2008 | Overton et al. |
| 2008/0304800 A1 | 12/2008 | Bickham et al. |
| 2008/0317410 A1 | 12/2008 | Griffioen et al. |
| 2009/0060437 A1 | 3/2009 | Fini et al. |
| 2009/0126407 A1 | 5/2009 | Bookbinder et al. |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |

FOREIGN PATENT DOCUMENTS

| | | |
|---|---|---|
| EP | 1437612 A2 | 7/2004 |
| EP | 1571470 A1 | 9/2005 |
| EP | 1617243 A1 | 1/2006 |
| EP | 1785754 A1 | 5/2007 |
| EP | 1845399 A1 | 10/2007 |
| EP | 1921478 A1 | 5/2008 |
| EP | 2261706 A2 | 12/2010 |
| WO | 2009/062131 A1 | 5/2009 |
| WO | 2009/064381 A1 | 5/2009 |

OTHER PUBLICATIONS

Ohsono et al., "High Performance Optical Fibers for Next Generation Transmission Systems", Hitachi Cable Review, No. 22, pp. 1-5, (Aug. 2003).

Kato et al., "Field Installable Connector Optimized for Holey Fiber", Optical Society of America, pp. 1-3 (2007).

Kim et al., "A Novel Fabrication Method of Versatile Holey Fibers with Low Bending Loss and Their Optical Characteristics", Optical Society of America, pp. 1-4 (2005).

French Search Report and Written Opinion in counterpart French Application No. FR 09/00299, dated Sep. 4, 2009.

U.S. Appl. No. 12/098,804 for a "Transmission Optical Fiber Having Large Effective Area," Sillard et al., filed May 6, 2009.

European Search Report and Written Opinion in counterpart European Application No. 10075023.1 dated Jul. 26, 2011, pp. 1-6.

European Office Action in counterpart European Application No. 10075023.1 dated Jul. 20, 2012, pp. 1-7.

* cited by examiner

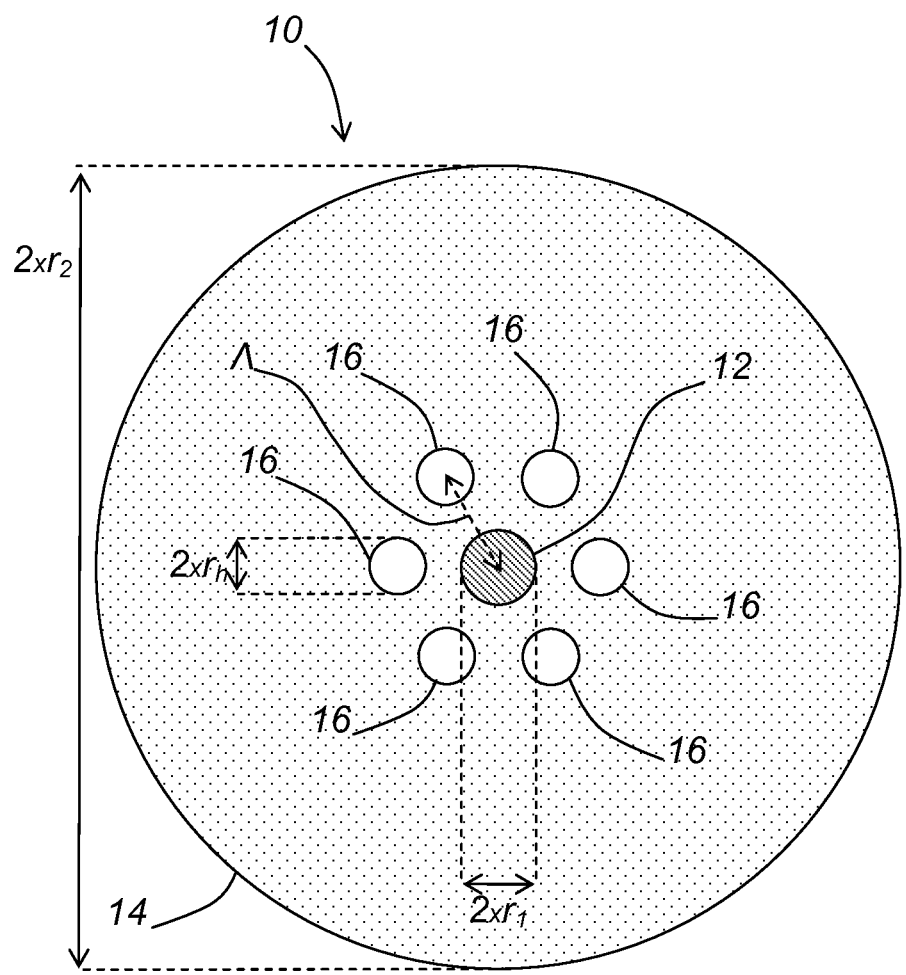

SINGLE-MODE OPTICAL FIBER

CROSS-REFERENCE TO PRIORITY APPLICATIONS

This application claims the benefit of pending French application Ser. No. 09/00299 for "Fibre Optique Monomode" (filed Jan. 23, 2009, at the French Patent Office), which is hereby incorporated by reference in its entirety.

This application further claims the benefit of commonly assigned U.S. Provisional Patent Application Ser. No. 61/154,538, for "Fibre Optique Monomode" (filed Feb. 23, 2009), which is hereby incorporated by reference in its entirety.

FIELD OF THE INVENTION

The present invention relates to the field of optical fiber transmissions and, more specifically, an optical fiber having substantially reduced bending losses.

BACKGROUND

The index profile of optical fibers is typically described as the graphical appearance of the function that associates the refractive index with the radius of the optical fiber. Conventionally, the distance r to the center of the optical fiber is shown on the x-axis, and the difference between the refractive index (at radius r) and the refractive index of the optical fiber cladding is shown on the y-axis. Thus the terms "step," "trapezoid," "alpha," or "triangle" index profile are used to describe graphs having curves with the shapes of a step, trapezoid, alpha, or triangle. These curves are generally representative of the theoretical or set profile of the optical fiber. Constraints in the manufacture of the optical fiber, however, may result in a slightly different actual profile.

An optical fiber conventionally includes an optical fiber core which transmits and/or amplifies an optical signal, and an optical cladding which confines the optical signal within the core. Accordingly, the refractive index of the core $n_c$ is typically greater than the refractive index of the cladding $n_g$ (i.e., $n_c > n_g$). The propagation of an optical signal in a single-mode optical fiber is broken down into (i) a fundamental mode in the core (called $LP_{01}$) and (ii) secondary modes guided over a certain distance in the core-cladding assembly, called cladding modes.

Conventionally, step-index fibers, also called single-mode fibers (SMFs), are used as line fibers for optical fiber transmission systems. These fibers exhibit chromatic dispersion and a chromatic dispersion slope meeting specific telecommunications standards as well as standardized cut-off wavelength and effective area values.

To facilitate compatibility between optical systems from different manufacturers, the International Telecommunication Union (ITU) defined a standard reference ITU-T G.652, with which a standard optical transmission fiber (i.e., a standard single mode fiber or SSMF) should comply. The ITU-T G.652 standard and each of its attributes (i.e., the A, B, C, and D sub-standards) are hereby incorporated by reference.

For a transmission fiber, the ITU-T G.652 standard recommends: (i) at a wavelength of 1310 nanometers, a mode field diameter (MFD, also herein referred to as "$2W_{02}$") of between about 8.6 and 9.5 microns with a tolerance of ±0.6 microns (i.e., a MFD of between about 8.0 microns and 10.1 microns); (ii) a cable cut-off wavelength of 1260 nanometers or less; (iii) a zero dispersion wavelength (ZDW) (i.e., the chromatic dispersion coefficient) of between about 1300 and 1324 nanometers; and (iv) a chromatic dispersion slope (i.e., a zero dispersion slope or ZDS) of 0.092 ps/(nm²·km) or less at the zero dispersion wavelength. Conventionally, the cable cut-off wavelength ($\lambda_{CC}$) is measured as the wavelength at which the optical signal is no longer single mode after propagation over twenty-two meters of optical fiber, such as defined by subcommittee 86A of the International Electrotechnical Commission in the IEC 60793-1-44 standard, which is hereby incorporated by reference.

Moreover, for applications including fibers intended for optical systems laid to private homes (e.g., fiber to the home (FTTH) or fiber to the curb (FTTC)), reducing bending losses is important, particularly when the optical fiber will be clipped or coiled in a miniaturized optical box. Standards have thus been defined to impose bending-loss limits on fibers intended for such applications.

The ITU-T G.657B standard reproduces many of the requirements of the ITU-T G.652 standard while imposing stricter limits on bending losses. That said, the ITU-T G.657B standard provides a more generous range for mode field diameter (i.e., mode field diameter ($2W_{02}$) between 6.3 microns and 9.5 microns, with a tolerance of +/−0.4 micron).

In this regard, the ITU-T G.657B standard suggests that at a wavelength of 1550 nanometers, the bending losses should be less than 0.003 dB/turn for a radius of curvature of 15 millimeters (i.e., 0.03 dB for ten turns), 0.1 dB/turn for a radius of curvature of 10 millimeters, and 0.5 dB/turn for a radius of curvature of 7.5 millimeters. Furthermore, at a wavelength of 1625 nanometers, the bending losses should be less than 0.01 dB/turn for a radius of curvature of 15 millimeters (i.e., 0.1 dB for ten turns), 0.2 dB/turn for a radius of curvature of 10 millimeters, and 1 dB/turn for a radius of curvature of 7.5 millimeters. The ITU-T G.657 standard and each of its attributes are hereby incorporated by reference.

For a given optical fiber, a value known as the MAC value is defined as the ratio of the mode field diameter ($2W_{02}$) of the optical fiber at 1550 nanometers to the effective cut-off wavelength ($\lambda_{Ceff}$). Conventionally, the effective cut-off wavelength is measured as the lowest wavelength at which the optical signal is single mode after propagation over two meters of optical fiber, as defined by subcommittee 86A of the IEC in the IEC 60793-1-44 standard, which is hereby incorporated by reference. The MAC value can be used to assess the performance of the optical fiber.

Commonly assigned European Patent No. 1,845,399 (and its counterpart U.S. Pat. No. 7,587,111) and commonly assigned European Patent No. 1,785,754 (and its counterpart U.S. Pat. No. 7,623,747), which are hereby incorporated by reference, disclose experimental results and establish a relationship between the MAC at a wavelength of 1550 nanometers and bending losses at a wavelength of 1625 nanometers with a radius of curvature (i.e., a bend radius) of 15 millimeters in a standard SSMF step-index fiber. In particular, these documents illustrate that the MAC value has an effect on the bending losses of the optical fiber and that these bending losses can be reduced by reducing the MAC. Reducing the MAC, however, can result in noncompliance with the ITU-T G.652 standard.

In this regard, reducing bending losses while retaining certain optical transmission parameters (e.g., mode field diameter and cut-off wavelength) constitutes a major challenge for FTTH or FTTC applications.

U.S. Pat. No. 7,164,835 and U.S. Patent Publication No. 2007/0147756, which are hereby incorporated by reference, describe fiber profiles having limited bending losses. These fiber profiles, however, only barely comply with the criteria of the ITU-T G.652 standard, particularly with respect to mode field diameter and chromatic dispersion.

Holey fibers are optical fibers having a regular arrangement of air holes running along their length to act as a part of a cladding.

Moreover, holey-fiber technology makes it possible to achieve improved bending-loss performance (i.e., reduced bending losses). In this regard, optical fibers implementing this technology have been proposed.

For example, U.S. Pat. No. 6,901,197, which is hereby incorporated by reference, describes an optical fiber having a central core and an optical cladding. A plurality of holes is formed in the optical cladding. These holes are arranged to form concentric hexagons.

U.S. Patent Publication No. 2006/0024009, which is hereby incorporated by reference, describes a single mode fiber including a central core and an optical cladding. The optical cladding includes a plurality of cylindrical air holes which form a network. The air holes are arranged periodically such that the center-to-center distance between two adjacent air holes is at least equal to 1.5 times the wavelength of the light propagating in the optical fiber.

U.S. Pat. No. 6,636,677, which is hereby incorporated by reference, describes an optical fiber including a central core and an optical cladding in which a plurality of air holes arranged in concentric circles is formed.

U.S. Pat. No. 5,907,652, which is hereby incorporated by reference, discloses a multimode fiber having a central core, a multimode intermediate optical cladding, a first and a second external optical cladding, and a polymer coating. According to this document, air holes are formed in the first outer cladding. The air holes occupy a volume greater than 75 percent of the volume of the first outer optical cladding.

U.S. Patent Publication No. 2006/0045448, which is hereby incorporated by reference, describes an optical fiber having a central core and an optical cladding in which a plurality of cylindrical air holes are arranged in a ring.

Another optical fiber including a central core and an optical cladding having cylindrical air holes distributed in a ring is described in the article "*Hole-assisted fiber design for small bending and splice losses*," from IEEE photonics technology letters, vol. 15, No. 12, December 2003, which is hereby incorporated by reference. The diameter of the holes is equal to the diameter of the central core.

The article "*High performance optical fibers for next generation transmission systems*," from Hitachi Cable Review, No. 22, August 2003, which is hereby incorporated by reference, also describes an optical fiber including a central core and an optical cladding having six air holes. This article, however, does not give any details concerning the dimensions of the different elements of the optical fiber.

Similarly, the article "*Field installable connector optimized for holey fiber*," by Y. Kato, K. Suzuki and K. Ohsono from the proceedings of the Optical fiber communications conference, OFC 2007, communication NthA2, which is hereby incorporated by reference, also describes an optical fiber including a central core and an optical cladding having six air holes. This article, however, does not give details concerning the dimensions of the different elements of the optical fiber.

Finally, the article "*A novel fabrication method of versatile holey fibers with low bending loss and their optical characteristics*," by G. H. Kim, Y. G. Han, H. S. Cho, S. H. Kim, S. B. Lee, K. S. Lee, C. H. Jeong, C. H. Oh, H. J. Kang, from the proceedings of the Optical fiber communications conference, OFC 2006, communication OWI2, which is hereby incorporated by reference, describes an optical fiber including a central core and an optical cladding in which six air holes are arranged in a ring. The diameter of the holes is greater than the diameter of the central core.

The previously discussed documents, however, fail to provide an optical fiber having low bend losses and a relatively high MAC value.

In this regard, there exists a need for an optical fiber having good resistance to bending losses, while still possessing a relatively high MAC value.

SUMMARY

Accordingly, the invention embraces a holey optical fiber that achieves reduced bending losses while retaining a high MAC value. Designing optical fiber profiles is complicated because a number of independent parameters affecting bending loss also affect the mode field diameter ($2W_{02}$) and cutoff wavelength. In this regard, designing optical fiber profiles is typically carried out in a four-dimensional space defined by core radius ($r_1$), hole radius ($r_h$), normalized refractive index difference ($\Delta n$), and separation between central core and hole ($\Lambda$) (i.e., pitch).

In an exemplary embodiment, the invention embraces an optical fiber that includes, from its center to its periphery, a central core and an optical cladding. Typically, the central core has a refractive index $n_1$ and a radius $r_1$ of between about 3.2 microns and 4.5 microns (e.g., 3.2 µm<$r_1$<4.5 µm). The optical cladding typically has a refractive index $n_2$ such that $n_2$<$n_1$ and $$0.31\% < \Delta n = \frac{n_1 - n_2}{n_2} < 0.55\%.$$

The optical cladding typically includes at least five holes of radius $r_h$ distributed (i.e., positioned) at a distance $\Lambda$ from the central core. In this regard, this separation distance $\Lambda$ (i.e., the pitch) is measured from the center of the central core to the center of the respective holes, wherein (i) $0.5r_1 \leq r_h \leq r_1$, and (ii) 9 microns<$\Lambda \leq$17 microns.

Typically, the optical fibers according to the present invention have a MAC value of at least 6.5. In this regard, the MAC value is typically defined as the ratio of mode field diameter at 1550 nanometers to effective cut-off wavelength ($\lambda_{Ceff}$).

In another exemplary embodiment, the invention embraces an optical fiber that has at least five holes that are circumferentially equidistantly positioned relative to the central core.

In yet another exemplary embodiment, the invention embraces an optical fiber having a MAC value of less than 8.5 that, at a wavelength of 1550 nanometers, exhibits bending losses of less than $5.0 \times 10^{-1}$ dB/turn for a radius of curvature ($R_C$) of 7.5 millimeters, and less than $1.0 \times 10^{-1}$ dB/turn for a radius of curvature of 10 millimeters.

In yet another exemplary embodiment, the invention embraces an optical fiber having a MAC value of less than 8.5 that, at a wavelength of 1625 nanometers, exhibits bending losses of less than 1.0 dB/turn for a radius of curvature of 7.5 millimeters, and less than 0.2 dB/turn for a radius of curvature of 10 millimeters.

In yet another exemplary embodiment, the invention embraces an optical fiber having a MAC value of less than 8.4 that, at a wavelength of 1550 nanometers, exhibits bending losses of less than $6 \times 10^{-1}$ dB/turn for a radius of curvature of 5 millimeters, and less than $8 \times 10^{-3}$ dB/turn for a radius of curvature of 15 millimeters.

In yet another exemplary embodiment, the invention embraces an optical fiber having a MAC value of less than 8 that, at a wavelength of 1550 nanometers, exhibits bending losses of less than $3.0\times10^{-1}$ dB/turn for a radius of curvature of 5 millimeters, and less than $4.0\times10^{-3}$ dB/turn for a radius of curvature of 15 millimeters.

In yet another exemplary embodiment, the invention embraces an optical fiber having a MAC value of less than 7.5 that, at a wavelength of 1550 nanometers, exhibits bending losses of less than $2.0\times10^{-1}$ dB/turn for a radius of curvature of 5 millimeters, and less than $7.0\times10^{-4}$ dB/turn for a radius of curvature of 15 millimeters.

In yet another exemplary embodiment, the invention embraces an optical fiber having a MAC value of less than 7 that, at a wavelength of 1550 nanometers, exhibits bending losses of less than $1.0\times10^{-1}$ dB/turn for a radius of curvature of 5 millimeters, and less than $1.0\times10^{-5}$ dB/turn for a radius of curvature of 15 millimeters.

Typically, the present optical fibers possess a zero dispersion wavelength ($\lambda_0$) of between about 1300 nanometers and 1324 nanometers (i.e., $1300<\lambda_0<1324$ nanometers). Furthermore, at the zero dispersion wavelength, the present optical fibers typically possess a chromatic dispersion slope of less than $9.2\times10^{-2}$ ps/(nm²·km).

Typically, the present optical fibers exhibit a cable cut-off wavelength ($\lambda_{CC}$) of less than about 1260 nanometers and an effective cut-off wavelength ($\lambda_{Ceff}$) of less than about 1280 nanometers (e.g., 1260 nanometers or less). In this regard, an effective cut-off wavelength of 1280 nanometers or less typically yields a cable cut-off wavelength of 1260 nanometers or less.

Typically, at a wavelength of 1310 nanometers, the present optical fibers possess a mode field diameter ($2W_{02}$) of between about 8.6 and 9.5 microns, with a tolerance of ±0.6 microns (i.e., between about 8.0 microns and 10.1 microns).

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 schematically depicts a cross-sectional view of an exemplary holey optical fiber according to the present invention.

DETAILED DESCRIPTION

As illustrated in FIG. 1, an exemplary optical fiber 10 according to the present invention has a central core 12 and a surrounding optical cladding 14 that defines holes.

Those having ordinary skill in the art will recognize that there are various processes for manufacturing optical preforms.

Typically, the central core 12 is obtained by CVD-type deposition in a silica tube to form an optical preform and the optical cladding 14 is constituted by the silica tube, which may be refilled with natural or doped silica. The central core 12 can also be obtained by any other deposition technique (e.g., VAD or OVD). The optical fiber 10 also includes holes 16 that are formed in the optical cladding 14. These holes 16 can be obtained by drilling the optical preform after the deposition of the central core 12 and the overcladding have been carried out, or by any other technique. The optical fiber 10 may then be obtained by drawing the preform.

In another process embodiment, holey fiber may be obtained by drawing a preform obtained via a sol-gel method. In this regard, the preform is produced by molding.

In yet another process embodiment, the preform may be obtained via a stack and draw technique. According to this process, the preform is produced by assembling hollow tubes to form the holes, and solid rods to form the central core and the cladding.

FIG. 1 schematically depicts an exemplary embodiment of an optical fiber including six holes 16 in the optical cladding 14. In this regard, the optical fiber 10 typically includes at least five holes (e.g., six holes or more).

Typically, the holes 16 of the optical fiber 10 are arranged in a single ring around the central core 12. In this regard, there is an approximately constant angular separation between two successive holes 16 as measured from the center of the central core 12. In other words, the holes 16 of the optical fiber 10 are circumferentially equidistantly distributed around the central core 12. Thus, the holes 16 are configured substantially equidistantly from the central core 12, and the distance between two adjacent holes 16 is substantially constant.

As compared with optical fibers having holes arranged in a single ring, optical fibers having a structure with several rings of air holes around the central core typically exhibit greater bending losses. This is particularly so for radii of curvature less than 15 millimeters. Moreover, optical fibers with several concentric rings of air holes can be more complicated to manufacture than optical fibers having holes configured in a single ring around a central core.

An exemplary optical fiber 10 according to the invention includes a central core 12 having a refractive index $n_1$ and an optical cladding 14 having a refractive index $n_2$ that is less than the central core's refractive index $n_1$ (i.e., $n_1$ is greater than $n_2$).

Typically, the width of the central core 12 is defined by its radius $r_1$, the width of the optical cladding 14 by its outer radius $r_2$, and the width of the holes 16 by the radius $r_h$.

In exemplary embodiments, the central core 12 has a radius $r_1$ of between about 3.2 microns and 4.5 microns (i.e., substantially equivalent to that of a standard single mode fiber (SSMF)).

The radius $r_2$ of the optical cladding 14 is typically between about 80 microns and 125 microns. Optical fibers including an optical cladding 14 having a radius $r_2$ of 80 microns typically exhibit improved mechanical strength.

Moreover, the central core 12 and the optical cladding 14 typically possess refractive indices $n_1$ and $n_2$ such that $n_2<n_1$ and:

$$0.31\% < \Delta n = \frac{n_1 - n_2}{n_2} < 0.55\%.$$

The diameter of the central core 12, as well as its index difference relative to the optical cladding 14, help to achieve propagation conditions of the optical signal that are compatible with the ITU-T G.652 standard, particularly with respect to chromatic dispersion and mode field diameter ($2W_{02}$).

Typically, the optical cladding 14 includes at least five (e.g., six to eight) holes 16, of radius $r_h$ that are circumferentially equidistantly positioned at a distance $\Lambda$ from the central core 12. These holes 16 form negative step indices in the optical cladding 14 and thus contribute to an improvement in the optical fiber's bending loss characteristics. In an exemplary embodiment, the optical fiber 10 includes exactly eight holes 16.

The holes 16 are typically substantially continuous channels. In this regard, the holes extend longitudinally along the axis of the optical fiber 10. The holes 16, however, can also extend helicoidally along the length of the optical fiber 10. In other words, the holes 16 can also be twisted or stranded about the central core 12. Typically, the hole radius is substantially uniform along an optical fiber's length.

The holes 16 can be filled with air, particularly dry air. In this regard, humidity in the air can cause an increase in the dissipation of the optical fiber 10. In some exemplary embodiments, therefore, the holes 16 are filled with an inert gas such as argon, helium, or nitrogen.

Typically, the distance Λ between the center of the holes 16 and the center of the central core 12 (i.e., the pitch) is between about 9 microns and 17 microns (e.g., between about 11 microns and 15 microns). In a particular exemplary embodiment, the distance Λ is about 13 microns. In this regard, if the holes 16 are too close to the central core 12, they allow the propagation of higher-order modes in the optical fiber 10, which results in an increase in the cut-off wavelength. On the other hand, if the holes 16 are too far from the central core 12, the optical fiber's bending losses may not comply with the ITU-T G.657 standard.

In another aspect of the present invention, the radius of the holes $r_h$ and the radius of the central core $r_1$ typically satisfy the following relationship: $0.5r_1 \leq r_h \leq r_1$. More typically, $r_h$ and $r_1$ satisfy the relationship: $0.6r_1 \leq r_h \leq r_1$. In another exemplary embodiment $r_h$ and $r_1$ satisfy the relationship: $0.7r_1 \leq r_h \leq r_1$ (e.g., $0.75r_1 \leq r_h \leq 0.95r_1$). In yet another exemplary embodiment, $r_h$ and $r_1$ satisfy the relationship: $0.6r_1 \leq r_h \leq 0.9r_1$ (e.g., $0.65r_1 \leq r_h \leq 0.85r_1$). In yet another exemplary embodiment, $r_h$ and $r_1$ satisfy the relationship: $0.7r_1 \leq r_h \leq 0.9r_1$ (e.g., $r_h \approx 0.8r_1$). In a particular exemplary embodiment, $r_h$ is equal to $0.75r_1$. If $r_h < 0.5r_1$ the bending loss specifications regarding the ITU-T G.657B standard are not satisfied (see e.g., Table II, column Ebis).

More generally, if the radius $r_h$ of the holes 16 of the optical fiber 10 is too small (e.g., $r_h < 0.5r_1$), it is difficult to achieve bending losses that satisfy the limits imposed by the ITU-T G.657 standard. On the other hand, if the radius $r_h$ of the holes 16 of the optical fiber 10 is too large, higher-order modes may be allowed to propagate in the optical fiber 10, which can lead to an increase in cut-off wavelength.

That said, the previously recited values for the various holey-fiber parameters yield an optical fiber 10 having both low bending losses and a relatively high MAC value.

In this regard, optical fibers of the present invention typically have a MAC value greater than 6.5.

In accordance with the present invention, exemplary optical fibers may have a MAC value less than 8.5 (e.g., 6.5 to 8.5) and, for a wavelength of 1550 nanometers, bending losses of less than 0.5 dB/turn for a radius of curvature of 7.5 millimeters and bending losses of less than 0.1 dB/turn for a radius of curvature of 10 millimeters.

For example, in one embodiment, the optical fiber 10 possesses a MAC value less than 8.4 (e.g., 6.5 to 8.4) and, for a wavelength of 1550 nanometers, bending losses of less than $6 \times 10^{-1}$ dB/turn for a radius of curvature of 5 millimeters and bending losses of less than $8 \times 10^{-3}$ dB/turn for a radius of curvature of 15 millimeters.

In another exemplary embodiment, the optical fiber 10 has a MAC value of less than 8.0 (e.g., 6.5 to 8.0) and, for a wavelength of 1550 nanometers, bending losses of less than $3 \times 10^{-1}$ dB/turn for a radius of curvature of 5 millimeters and bending losses of less than $4 \times 10^{-3}$ dB/turn for a radius of curvature of 15 millimeters.

According to another exemplary embodiment, the optical fiber 10 has a MAC value of less than 7.7 (e.g., 6.5 to 7.5) and, for a wavelength of 1550 nanometers, bending losses of less than $3 \times 10^{-1}$ dB/turn for a radius of curvature of 5 millimeters and bending losses of less than $7 \times 10^{-4}$ dB/turn for a radius of curvature of 15 millimeters.

In yet another exemplary embodiment, the optical fiber 10 has a MAC value of less than 7.5 (e.g., 6.5 to 7.5) and, for a wavelength of 1550 nanometers, bending losses of less than $2 \times 10^{-1}$ dB/turn for a radius of curvature of 5 millimeters and bending losses of less than $5 \times 10^{-4}$ dB/turn for a radius of curvature of 15 millimeters.

According to yet another exemplary embodiment, the optical fiber 10 has a MAC value of less than 7 (e.g., 6.5 to 7.0) and, for a wavelength of 1550 nanometers, bending losses of less than $8 \times 10^{-2}$ dB/turn for a radius of curvature of 5 millimeters, and bending losses of less than $1.5 \times 10^{-5}$ dB/turn for a radius of curvature of 15 millimeters.

An exemplary optical fiber 10 according to the present invention typically possesses a zero dispersion wavelength ($\lambda_0$) of between about 1300 and 1324 nanometers (i.e., $1300 < \lambda_0 < 1324$ nanometers). At the zero dispersion wavelength, the optical fiber 10 typically also possesses a chromatic dispersion slope value of less than 0.092 ps/(nm²·km). Thus, the present optical fiber 10 typically complies with the ITU-T G.652 standard with respect to chromatic dispersion.

Typically, the optical fiber 10 possesses a cable cut-off wavelength ($\lambda_{CC}$) of less than about 1260 nanometers and, at a wavelength of 1310 nanometers, a mode field diameter ($2W_{02}$) of between about 8.6 microns and 9.5 microns with a tolerance of ±0.6 microns (i.e., between about 8.0 microns and 10.1 microns). These values, of course, reflect the ITU-T G.652 recommendations.

In a particular exemplary embodiment according to the present invention, an optical fiber 10 possesses a cable cut-off wavelength ($\lambda_{CC}$) of less than about 1260 nanometers and, at a wavelength of 1310 nanometers, a mode field diameter ($2W_{02}$) of 8.83 microns. In this regard, the exemplary optical fiber has a MAC value of 7.7. Furthermore, this exemplary optical fiber possesses a zero dispersion wavelength of 1314 nanometers and, at the zero dispersion wavelength, a chromatic dispersion slope value of 0.09 ps/(nm²·km). This exemplary optical fiber exhibits, for a wavelength of 1550 nanometers, bending losses of (i) $2 \times 10^{-2}$ dB/turn for a radius of curvature of 5 millimeters, (ii) $5 \times 10^{-2}$ dB/turn for a radius of curvature of 7.5 millimeters, (iii) $1 \times 10^{-2}$ dB/turn for a radius of curvature of 10 millimeters, and (iv) $8 \times 10^{-4}$ dB/turn for a radius of curvature of 15 millimeters. Additionally, the exemplary optical fiber exhibits, for a wavelength of 1625 nanometers, bending losses of (i) $3 \times 10^{-2}$ dB/turn for a radius of curvature of 5 millimeters, (ii) $9 \times 10^{-2}$ dB/turn for a radius of curvature of 7.5 millimeters, (iii) $3 \times 10^{-2}$ dB/turn for a radius of curvature of 10 millimeters, and (iv) $4 \times 10^{-3}$ dB/turn for a radius of curvature of 15 millimeters.

More generally, exemplary optical fibers according to the present invention typically comply with the ITU-T G.652 standard with respect to cut-off wavelength and mode field diameter. Splicing with other existing G.652 standard compliant fibers, therefore, can be achieved with reduced losses. Furthermore, at least some embodiments of the present optical fiber are fully compliant with the ITU-T G.652 fiber attributes and the ITU-T G.657A/B fiber attributes.

* * *

EXAMPLES

The following tables (below) illustrate aspects of the present invention by providing both inventive and comparative optical-fiber examples (e.g., prophetic examples).

The first line of each of Tables I-IV provides a reference to each optical fiber (i.e., from A to N). The second line defines the radius ($r_1$) of the corresponding central core. The third line indicates the normalized refractive index difference Δn in the form of the following relationship:

$$\Delta n = \frac{n_1 - n_2}{n_2},$$

where $n_1$ is the refractive index of the central core and $n_2$ is the refractive index of the optical cladding. The refractive index of the central core is, therefore, provided as a percentage relative to the optical cladding.

The next four lines indicate, respectively: the number of holes present in the optical cladding; the radius of the holes ($r_h$); the relationship between the radius of the holes and the radius of the central core ($r_h/r_1$); and the center-to-center distance Λ between the holes and the central core (i.e., the distance between the holes and the central core as measured from the respective centers of the holes and the center of the central core).

The next two lines indicate the field mode field diameter ($2W_{02}$) at a wavelength of 1310 nanometers and at a wavelength of 1550 nanometers, respectively. The mode field diameter ($2W_{02}$) is defined according to the Petermann II equation.

The next two lines indicate respectively the effective fiber cut-off wavelength ($\lambda_{Ceff}$) and the MAC defined as the relationship $2W_{02} \div \lambda_{Ceff}$.

The next four lines give the bending losses (denoted as "BL") at the wavelength of 1550 nanometers for, respectively, radii of curvature $R_C$ of 15 millimeters, 10 millimeters, 7.5 millimeters, and 5 millimeters. The bending losses are expressed in decibels (dB) per turn.

The next four lines give the bending losses (denoted as "BL") at the wavelength of 1625 nanometers for, respectively, radii of curvature $R_C$ of 15 millimeters, 10 millimeters, 7.5 millimeters, and 5 millimeters. As before, the bending losses are expressed in decibels (dB) per turn.

* * *

The optical fibers shown in Table I each include six holes with a radius ($r_h$) of 3 microns circumferentially equidistantly distributed at a distance Λ equal to 13 microns from the center of the central core.

TABLE I

|  | A | B | C | D |
|---|---|---|---|---|
| $r_1$ (μm) | 4.4 | 4 | 3.5 | 3.2 |
| Δn (%) | 0.31 | 0.36 | 0.47 | 0.55 |
| Number of holes | | | 6 | |
| $r_h$ (μm) | | | 3 | |
| ($r_h/r_1$) | 0.68 | 0.75 | 0.86 | 0.94 |
| Λ (μm) | | | 13 | |
| $2W_{02}$ @ 1310 nm (μm) | 9.6 | 8.8 | 7.8 | 7.2 |
| $2W_{02}$ @ 1550 nm (μm) | 10.5 | 9.8 | 8.8 | 8.1 |
| $\lambda_{Ceff}$ (nm) | 1252 | 1254 | 1255 | 1251 |
| MAC | 8.4 | 7.8 | 7 | 6.5 |
| BL @ 1550 nm (dB/turn) $R_c$ = 15 mm | $7.2 \times 10^{-3}$ | $8.1 \times 10^{-4}$ | $1.0 \times 10^{-5}$ | $2.5 \times 10^{-7}$ |
| $R_c$ = 10 mm | $5.6 \times 10^{-2}$ | $1.5 \times 10^{-2}$ | $1.1 \times 10^{-3}$ | $1.1 \times 10^{-4}$ |
| $R_c$ = 7.5 mm | $1.6 \times 10^{-1}$ | $6.2 \times 10^{-2}$ | $8.5 \times 10^{-3}$ | $1.8 \times 10^{-3}$ |
| $R_c$ = 5 mm | $5.4 \times 10^{-1}$ | $3.3 \times 10^{-1}$ | $7.0 \times 10^{-2}$ | $2.0 \times 10^{-2}$ |
| BL @ 1625 nm (dB/turn) $R_c$ = 15 mm | $2.0 \times 10^{-2}$ | $3.4 \times 10^{-3}$ | $9.8 \times 10^{-5}$ | $4.2 \times 10^{-6}$ |
| $R_c$ = 10 mm | $9.8 \times 10^{-2}$ | $3.3 \times 10^{-2}$ | $4.1 \times 10^{-3}$ | $6.1 \times 10^{-4}$ |
| $R_c$ = 7.5 mm | $2.6 \times 10^{-1}$ | $1.0 \times 10^{-1}$ | $2.1 \times 10^{-2}$ | $5.9 \times 10^{-3}$ |
| $R_c$ = 5 mm | $9.3 \times 10^{-1}$ | $4.6 \times 10^{-1}$ | $1.1 \times 10^{-1}$ | $5.0 \times 10^{-2}$ |

It is noted that the fiber examples of Table I differ in (i) dimension of the central core, which has a radius $r_1$ of between 3.2 microns and 4.4 microns and (ii) variation of the difference in refractive index Δn between the core and the cladding, which includes values of between 0.31 percent and 0.55 percent.

The relationship between the radius of the holes and the radius of the central core varies between 0.68 and 0.94.

It is noted that only Fiber B complies with the nominal ITU-T G.652 standard with respect to mode field diameter. Fiber A complies with the ITU-T G.652 standard with respect to mode field diameter when the corresponding tolerances are considered (i.e., 8.6 microns to 9.5 microns +/−0.6 micron).

Fibers A, B, C, and D have an effective cut-off wavelength of between 1251 nanometers and 1255 nanometers. Thus, each of these optical fibers has an effective fiber cut-off wavelength ($\lambda_{Ceff}$) that ensures a cable cut-off wavelength ($\lambda_{CC}$) of 1260 nanometers or less in compliance with the ITU-T G.652 recommendations.

The MAC value for each of the fiber examples is between 6.5 and 8.4.

Fibers A, B, C, and D have bending losses mostly within the limits of the ITU-T G.657B standard. That said, Fiber A has bending losses that, for a radius of curvature of 15 millimeters, are slightly above the recommended values set by the ITU-T G.657B standard (i.e., 0.003 dB/turn at 1550 nanometers and 0.01 dB/turn at 1625 nanometers).

That said, at a wavelength of 1550 nanometers, each fiber has bending losses of less than 0.5 dB/turn for a radius of curvature of 7.5 millimeters and less than 0.1 dB/turn for a radius of curvature of 10 millimeters.

In particular, Fiber C and Fiber D have bending losses ten times less than the bending losses required by the ITU-T G.657B standard for the two wavelengths (i.e., 1550 nanometers and 1625 nanometers).

* * *

Table II (below) provides properties for optical fibers having a central core with a radius of 4 microns. The refractive index difference between the central core and the optical cladding is equal to 0.36 percent for each of the fiber examples. Additionally, all the optical fibers characterized in Table II have six holes circumferentially equidistantly distributed at a distance of 13 microns from the central core (i.e., measured from center to center).

TABLE II

| | | E comparative | Ebis comparative | F | B | G comparative |
|---|---|---|---|---|---|---|
| $r_1$ (µm) | | | | 4 | | |
| $\Delta n$ (%) | | | | 0.36 | | |
| Number of holes | | | | 6 | | |
| $r_h$ (µm) | | 1 | 1.6 | 2 | 3 | 4 |
| $(r_h/r_1)$ | | 0.25 | 0.4 | 0.5 | 0.75 | 1 |
| $\Lambda$ (µm) | | | | 13 | | |
| $2W_{02}$ @ 1310 nm (µm) | | 8.9 | 8.9 | 8.9 | 8.8 | 8.7 |
| $2W_{02}$ @ 1550 nm (µm) | | 10.0 | 10.0 | 10.0 | 9.8 | 9.6 |
| $\lambda_{Ceff}$(nm) | | 1205 | 1211 | 1225 | 1254 | 1483 |
| MAC | | 8.3 | 8.3 | 8.1 | 7.8 | 6.4 |
| BL @1550 nm (dB/turn) | $R_c$ = 15 mm | $1.1 \times 10^{-2}$ | $7.7 \times 10^{-3}$ | $3.7 \times 10^{-3}$ | $8.1 \times 10^{-4}$ | $7.0 \times 10^{-5}$ |
| | $R_c$ = 10 mm | $2.7 \times 10^{-1}$ | $1.6 \times 10^{-1}$ | $7.9 \times 10^{-2}$ | $1.5 \times 10^{-2}$ | $1.0 \times 10^{-3}$ |
| | $R_c$ = 7.5 mm | 1.29 | $5.9 \times 10^{-1}$ | $3.5 \times 10^{-1}$ | $6.2 \times 10^{-2}$ | $4.1 \times 10^{-3}$ |
| | $R_c$ = 5 mm | 6.5 | 2.6 | 1.8 | $3.3 \times 10^{-1}$ | $2.0 \times 10^{-2}$ |
| BL @1625 nm (dB/turn) | $R_c$ = 15 mm | $5.0 \times 10^{-2}$ | $3.2 \times 10^{-2}$ | $1.6 \times 10^{-2}$ | $3.4 \times 10^{-3}$ | $2.8 \times 10^{-4}$ |
| | $R_c$ = 10 mm | $6.7 \times 10^{-1}$ | $3.7 \times 10^{-1}$ | $1.9 \times 10^{-1}$ | $3.3 \times 10^{-2}$ | $2.2 \times 10^{-3}$ |
| | $R_c$ = 7.5 mm | 2.2 | 1.0 | $6.0 \times 10^{-1}$ | $1.0 \times 10^{-1}$ | $6.6 \times 10^{-3}$ |
| | $R_c$ = 5 mm | 10.2 | 3.2 | 2.8 | $4.6 \times 10^{-1}$ | $2.7 \times 10^{-2}$ |

The fiber examples disclosed in Table II are distinguished from each other by hole radius. It should be noted that Example E, Example Ebis, and Example G are not optical fibers according to the present invention.

For instance, the holes in Fiber E and Fiber Ebis have radii that are too small. In this regard, Fiber E and Fiber Ebis have relatively high bending losses (i.e., at or above the values required by the ITU-T G.657B standard). Indeed, Fiber E fails to comply with any of the G.657B bending-loss recommendations and Fiber Ebis only complies with the G.657B bending-loss recommendations for a radius of curvature of 7.5 millimeters at a wavelength of 1625 nanometers (i.e., bending losses of less than 1.0 dB/turn).

By way of contrast, the holes in Fiber G have radii that are too large (i.e., equal to the radius of the central core) given the six-hole configuration. Such a diameter, in combination with six holes, results in a very high fiber cut-off wavelength, making it impossible to remain within the limits of the ITU-T G.652 standard (i.e., cable cut-off wavelength $\lambda_{CC}$ of 1260 nanometers or less). Fiber G also has a relatively low MAC value of less than 6.4.

Fiber B and Fiber F each have a mode field diameter at 1310 nanometers that complies with the ITU-T G.652 recommendations. Similarly, Fiber B and Fiber F have an effective fiber cut-off wavelength ($\lambda_{Ceff}$) that ensures a cable cut-off wavelength ($\lambda_{CC}$) that complies with the G.652 recommendations.

The MAC values of Fiber B and Fiber F are 7.8 and 8.1, respectively. Notwithstanding these high MAC values, Fiber B and Fiber F typically exhibit bending losses that are substantially lower than the limits of the ITU-T G.657B standard. In particular, at a wavelength of 1550 nanometers, these fibers have bending losses of less than 0.5 dB/turn for a radius of curvature of 7.5 millimeters and bending losses less than 0.1 dB/turn for a radius of curvature of 10 millimeters. Fiber F, however, has bending losses slightly exceeding the ITU-T G.657 recommendations for a radius of curvature of 15 millimeters.

* * *

Tables IIIa and IIIb (below) show optical fibers having a central core with a radius of 4 microns. The refractive index difference between the central core and the optical cladding is equal to 0.36 percent for each of the fiber examples. Finally, all of the optical fibers in Tables IIIa and IIIb have six holes circumferentially equidistantly distributed, albeit various distances ($\Lambda$) from the central core.

TABLE IIIa

| | | H comparative | I | B |
|---|---|---|---|---|
| $r_1$ (µm) | | | 4 | |
| $\Delta n$ (%) | | | 0.36 | |
| Number of holes | | | 6 | |
| $r_h$ (µm) | | | 3 | |
| $(r_h/r_1)$ | | | 0.75 | |
| $\Lambda$ (µm) | | 9 | 11 | 13 |
| $2W_{02}$ @1310 nm (µm) | | 7.6 | 8.6 | 8.8 |
| $2W_{02}$ @ 1550 nm (µm) | | 7.8 | 9.2 | 9.8 |
| $\lambda_{Ceff}$(nm) | | 1474 | 1274 | 1254 |
| MAC | | 5.3 | 7.2 | 7.8 |
| BL @1550 nm (dB/turn) | $R_c$ = 15 mm | $3.5 \times 10^{-4}$ | $4.8 \times 10^{-4}$ | $8.1 \times 10^{-4}$ |
| | $R_c$ = 10 mm | $1.5 \times 10^{-3}$ | $6.4 \times 10^{-3}$ | $1.5 \times 10^{-2}$ |
| | $R_c$ = 7.5 mm | $3.0 \times 10^{-3}$ | $2.3 \times 10^{-2}$ | $6.2 \times 10^{-2}$ |
| | $R_c$ = 5 mm | $6.6 \times 10^{-3}$ | $6.6 \times 10^{-2}$ | $3.3 \times 10^{-1}$ |
| BL @1625 nm (dB/turn) | $R_c$ = 15 mm | $1.4 \times 10^{-3}$ | $2.2 \times 10^{-3}$ | $3.4 \times 10^{-3}$ |
| | $R_c$ = 10 mm | $3.9 \times 10^{-3}$ | $1.4 \times 10^{-2}$ | $3.3 \times 10^{-2}$ |
| | $R_c$ = 7.5 mm | $5.3 \times 10^{-3}$ | $3.9 \times 10^{-2}$ | $1.0 \times 10^{-1}$ |
| | $R_c$ = 5 mm | $8.0 \times 10^{-3}$ | $1.2 \times 10^{-1}$ | $4.6 \times 10^{-1}$ |

TABLE IIIb

| | | J | K | L comparative |
|---|---|---|---|---|
| $r_1$ (µm) | | | 4 | |
| $\Delta n$ (%) | | | 0.36 | |
| Number of holes | | | 6 | |
| $r_h$ (µm) | | | 3 | |
| $(r_h/r_1)$ | | | 0.75 | |
| $\Lambda$ (µm) | | 15 | 17 | 19 |
| $2W_{02}$ @ 1310 nm (µm) | | 8.9 | 8.9 | 8.9 |
| $2W_{02}$ @ 1550 nm (µm) | | 10.1 | 10.1 | 10.2 |
| $\lambda_{Ceff}$(nm) | | 1244 | 1245 | 1247 |
| MAC | | 8.1 | 8.1 | 8.2 |
| BL @1550 nm (dB/turn) | $R_c$ = 15 mm | $1.9 \times 10^{-3}$ | $2.9 \times 10^{-3}$ | $3.8 \times 10^{-3}$ |
| | $R_c$ = 10 mm | $3.2 \times 10^{-2}$ | $5.4 \times 10^{-2}$ | $8.5 \times 10^{-2}$ |
| | $R_c$ = 7.5 mm | $1.6 \times 10^{-1}$ | $3.2 \times 10^{-1}$ | $6.4 \times 10^{-1}$ |
| | $R_c$ = 5 mm | 1.2 | 3.9 | 13 |
| BL @1625 nm (dB/turn) | $R_c$ = 15 mm | $7.4 \times 10^{-3}$ | $1.1 \times 10^{-2}$ | $1.5 \times 10^{-2}$ |
| | $R_c$ = 10 mm | $7.4 \times 10^{-2}$ | $1.3 \times 10^{-1}$ | $2.1 \times 10^{-1}$ |
| | $R_c$ = 7.5 mm | $2.7 \times 10^{-1}$ | $5.7 \times 10^{-1}$ | 1.2 |
| | $R_c$ = 5 mm | 1.7 | 5.0 | 17.0 |

Tables IIIa and IIIb illustrate the effect of the distance between the center of the core and the center of the holes (i.e., the pitch). In this regard, the tables contain the properties of optical fibers in which the respective distances (Λ) are between 9 and 19 microns. It should be noted, however, that, for the particular optical-fiber configuration set forth in Tables IIIa and IIIb, Fiber H has holes that are somewhat too close to the central core and Fiber L has holes that are somewhat too far from the central core.

In particular, comparative Fiber H has a fiber cut-off wavelength ($\lambda_{Ceff}$) of 1474 nanometers. This results in a cable cut-off wavelength ($\lambda_{CC}$) that exceeds the limit of the ITU-T G.652 standard (and the respective the ITU-T G.657A/B recommendations, too). Furthermore, Fiber H has a relatively low MAC value of 5.3. Comparative Fiber L typically has bending losses that exceed the limit values recommended by the ITU-T G.657B standard.

In contrast, the exemplary optical fibers according to the present invention that are characterized in Tables IIIa and IIIb (i.e., Fibers B, I, J, and K) exhibit, at a wavelength of 1310 nanometers, mode field diameter values between 8.6 microns and 8.9 microns. These values comply with the ITU-T G.652 recommendations. Moreover, each of Fibers B, I, J, and K has a fiber cut-off wavelength that ensures a cable cut-off wavelength ($\lambda_{CC}$) of 1260 nanometers or less.

Table IIIa shows that the bending losses of Fiber I are below the requirements of the ITU-T G.657B standard. In particular, for radii of curvature of 10 millimeters or 15 millimeters, these losses are significantly less than the limit values of the ITU-T G.657B recommendations.

Fiber J also has bending losses below the requirements of the ITU-T G.657B standard for the two wavelength values and for the different radii of curvature of the optical fiber.

Fiber K also has bending losses at or below most of the requirements of the ITU-T G.657B standard. At a wavelength of 1625 nanometers and for a radius of curvature of 15 millimeters, Fiber K has bending losses equal to $1.1 \times 10^{-2}$ dB/turn (i.e., slightly exceeding the limit value recommended by the ITU-T G.657B standard, namely $1.0 \times 10^{-2}$ dB/turn).

In general, Fibers I, B, J, and K all have bending losses that, at a wavelength of 1550 nanometers are less than 0.5 dB/turn for a radius of curvature of 7.5 millimeters and less than 0.1 dB/turn for a radius of curvature of 10 millimeters.

* * *

Table IV (below) shows optical fibers having a central core radius of 4 microns. The index difference between the central core and the optical cladding is equal to 0.36 percent for each of the fiber examples. Finally, all of the optical fibers characterized in Table IV have holes equidistantly distributed circumferentially at a distance of 13 microns from the central core, measured from center to center.

TABLE IV

|  |  | M | B | N |
|---|---|---|---|---|
| $r_1$ (µm) | | | 4 | |
| Δn (%) | | | 0.36 | |
| Number of holes | | 5 | 6 | 8 |
| $r_h$ (µm) | | 4 | 3 | 2 |
| ($r_h/r_1$) | | 1 | 0.75 | 0.5 |
| Λ (µm) | | | 13 | |
| 2W$_{02}$ @1310 nm (µm) | | 8.8 | 8.8 | 9.0 |
| 2W$_{02}$ @1550 nm (µm) | | 9.7 | 9.8 | 10.0 |
| $\lambda_{Ceff}$ (nm) | | 1262 | 1254 | 1267 |
| MAC | | 7.7 | 7.8 | 7.9 |
| BL @1550 nm | $R_c$ = 15 mm | $6.3 \times 10^{-4}$ | $8.1 \times 10^{-4}$ | $1.1 \times 10^{-3}$ |
| (dB/turn) | $R_c$ = 10 mm | $1.0 \times 10^{-2}$ | $1.5 \times 10^{-2}$ | $2.1 \times 10^{-2}$ |
| | $R_c$ = 7.5 mm | $4.2 \times 10^{-2}$ | $6.2 \times 10^{-2}$ | $6.8 \times 10^{-2}$ |
| | $R_c$ = 5 mm | $2.3 \times 10^{-1}$ | $3.3 \times 10^{-1}$ | $2.4 \times 10^{-1}$ |
| BL @1625 nm | $R_c$ = 15 mm | $3.2 \times 10^{-3}$ | $3.4 \times 10^{-3}$ | $5.0 \times 10^{-3}$ |
| (dB/turn) | $R_c$ = 10 mm | $2.3 \times 10^{-2}$ | $3.3 \times 10^{-2}$ | $4.2 \times 10^{-2}$ |
| | $R_c$ = 7.5 mm | $7.9 \times 10^{-2}$ | $1.0 \times 10^{-1}$ | $1.2 \times 10^{-1}$ |
| | $R_c$ = 5 mm | $3.1 \times 10^{-1}$ | $4.6 \times 10^{-1}$ | $3.8 \times 10^{-1}$ |

The three fiber examples in Table IV differ by the number of holes (i.e., five, six, and eight holes, respectively) formed in the optical cladding. The radius of each hole varies between 2 and 4 microns.

Fibers B, M, and N each have a mode field diameter of between 8.8 and 9 microns at a wavelength of 1310 nanometers. These values comply with the ITU-T G.652 standard.

Fibers B, M and N also have a fiber cut-off wavelength that ensures a cable cut-off wavelength that complies with the ITU-T G.652 standard. Moreover, Fibers B, M and N have bending losses complying with the ITU-T G.657B standard.

In particular, Fiber M has bending losses that, at a wavelength of 1550 nanometers, are ten times less than the corresponding limit values of the ITU-T G.657B standard for radii of curvature of 7.5 millimeters and 10 millimeters, respectively.

Moreover, Fibers B, M, and N have bending losses that, at a wavelength of 1625 nanometers, are significantly less than the values of the ITU-T G.657B standard for radii of curvature of 7.5 millimeters and 15 millimeters, respectively.

* * *

Optical fibers according to the present invention are typically suitable for use in optical systems laid to the home of the subscriber (e.g., FTTH or FTTC) in which the cabled optical fiber is subjected to significant bending stresses due to the miniaturization of the optical boxes or attachment by clips. Optical fibers according to the present invention may be placed in particularly compact optical modules or optical boxes, such as an optical box in which the optical fiber is arranged with a radius of curvature less than 15 millimeters (e.g., a radius of curvature of about 5 millimeters).

Optical fibers according to the present invention are typically compatible with optical fibers deployed in existing systems, particularly with respect to mode field diameter, which facilitates effective fiber-to-fiber splicing.

It is further within the scope of the present invention to employ the present optical fiber in combination with any kind of polychromatic source, such as light-emitting diodes (LEDs).

* * *

Various trench-assisted and/or void-assisted optical fibers (e.g., holey fibers) are disclosed in the following patents and patent application publications, each of which is hereby incorporated by reference in its entirety: U.S. Pat. No. 4,852,968 for an Optical Fiber Comprising a Refractive Index Trench (Reed); U.S. Pat. No. 5,044,724 for a Method of Producing Optical Fiber, and Fiber Produced by the Method (Glodis et al.); U.S. Pat. No. 6,901,197 for a Microstructured Optical Fiber (Hasegawa et al.); U.S. Pat. No. 7,095,940 for an Optical Fiber, Method for Manufacturing Same and Optical Transmission Channel (Hayami et al.); U.S. Pat. No. 7,228,040 for a Hole-Assisted Single Mode Optical Fiber (Nakajima et al.); U.S. Pat. No. 7,239,784 for an Optical Fiber, Method for Manufacturing Same and Optical Transmission Channel (Hayami et al.); U.S. Pat. No. 7,292,762 for a Hole-Assisted Holey Fiber and Low Bending Loss Multimode Holey Fiber (Guan et al.); U.S. Pat. No. 7,433,566 for a Low Bend Loss Optical Fiber with High Modulus Coating (Bookbinder et al.); U.S. Pat. No. 7,444,838 for a Holey Optical Fiber with Random Pattern of Holes and Method for Making the Same (Pickrell et al.); U.S. Pat. No. 7,526,166 for a High Numerical Aperture Fiber (Bookbinder et al.); U.S. Pat. No. 7,526,169 for a Low Bend Loss Quasi-Single-Mode Optical Fiber and Optical Fiber Line (Bickham et al.); U.S. Pat. No. 7,555,187 for a Large Effective Area Fiber (Bickham et al.); U.S. Pat. No. 7,567,742 for a Holey Optical Fiber with Random Pattern of Holes and Method for Making Same (Pickrell et al.); U.S. Pat. No. 7,450,806 for Microstructured Optical Fibers and Methods (Bookbinder et al.); U.S. Pat. No. 7,450,807 for a Low Bend Loss Optical Fiber with Deep Depressed Ring (Bickham et al.); U.S. Pat. No. 7,574,088 for an Optical Fiber and Optical Fiber Ribbon, and Optical Interconnection System (Sugizaki et al.); U.S. Patent Application Publication No. US 2008/0056654 A1 for a for a Low Bend Loss Single-Mode Optical Fiber (Bickham et al.); U.S. Patent Application Publication No. US 2008/0166094 A1 for a Bend Resistant Multimode Optical Fiber (Bickham et al.); U.S. Patent Application Publication No. US 2008/0304800 A1 for an Optical Fiber with Large Effective Area (Bickham et al.); U.S. Patent Application Publication No. US 2009/0060437 A1 for Bend Insensitivity in Single Mode Optical Fibers (Fini et al.); U.S. Patent Application Publication No. US 2009/0126407 A1 for Methods for Making Optical Fiber Preforms and Microstructured Optical Fibers (Bookbinder et al.); U.S. Patent Application Publication No. US 2009/0154888 A1 for a Bend Resistant Multimode Optical Fiber (Steele et al.); U.S. Patent Application Publication No. US 2009/0169163 A1 for a Bend Resistant Multimode Optical Fiber (Steele et al.); and International Patent Application Publication No. WO 2009/064381 A1 for Methods for Making Optical Fiber Preforms and Microstructured Optical Fibers (Bookbinder et al.).

\* \* \*

The present fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, the present optical fiber may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

\* \* \*

The present optical fiber may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation) it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No. 7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Patent Application Publication No. US2009/0003785 A1 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Patent Application Publication No. US2008/0317410 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

\* \* \*

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the fiber, thereby increasing the fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

* * *

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); and U.S. patent application Ser. No. 12/683,775 for a Method of Classifying a Graded-Index Multimode Optical Fiber, filed Jan. 7, 2010, (Gholami et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); and U.S. patent application Ser. No. 12/649,758 for a UVLED Apparatus for Curing Glass-Fiber Coatings, filed Dec. 30, 2009, (Hartsuiker et al.).

* * *

In the specification and figure, typical embodiments of the invention have been disclosed. The present invention is not limited to such exemplary embodiments. The figure is a schematic representation and so is not necessarily drawn to scale. Unless otherwise noted, specific terms have been used in a generic and descriptive sense and not for purposes of limitation.

The invention claimed is:

1. An optical fiber, comprising a central core and an optical cladding, wherein:

said central core has a refractive index $n_1$ and a radius $r_1$ such that 3.2 μm<$r_1$<4.5 μm;

said optical cladding has a refractive index $n_2$ such that $n_2$<$n_1$ and 0.31%<(($n_1$−$n_2$)÷$n_2$)<0.55%; and said optical cladding comprises at least five holes of radius $r_h$, each said hole positioned at a distance $\Lambda$ from said central core, the distance $\Lambda$ being measured from the center of said central core to the center of each said hole, wherein (i) 0.5$r_1$≦$r_h$≦$r_1$, and (ii) 9 μm<$\Lambda$≦17 μm;

wherein the optical fiber has an effective cut-off wavelength ($\Lambda_{Ceff}$) of 1280 nanometers or less;

wherein the optical fiber has a MAC value at least 6.5, the MAC value defined as the ratio of the optical fiber's mode field diameter ($2W_{02}$) at a wavelength of 1550 nanometers to the optical fiber's effective cut-off wavelength ($\Lambda_{Ceff}$); and wherein all holes in said optical cladding are substantially positioned in a single ring (i) equidistantly from said central core and (ii) circumferentially equidistantly around said central core.

2. The optical fiber according to claim 1, wherein:

at a wavelength of 1550 nanometers, the optical fiber has bending losses of less than about 0.5 dB/turn for a radius of curvature of 7.5 millimeters ($R_c$=7.5 mm);

at a wavelength of 1550 nanometers, the optical fiber has bending losses of less than about 0.1 dB/turn for a radius of curvature of 10 millimeters ($R_c$=10 mm); and the optical fiber has a MAC value of 8.5 or less.

3. The optical fiber according to claim 1, wherein:

at a wavelength of 1625 nanometers, the optical fiber has bending losses of less than about 1.0 dB/turn for a radius of curvature of 7.5 millimeters ($R_c$=7.5 mm);

at a wavelength of 1625 nanometers, the optical fiber has bending losses of less than about 0.2 dB/turn for a radius of curvature of 10 millimeters ($R_c$=10 mm); and the optical fiber has a MAC value of 8.5 or less.

4. The optical fiber according to claim 1, wherein:

at a wavelength of 1550 nanometers, the optical fiber has bending losses of less than about 0.6 dB/turn for a radius of curvature of 5 millimeters ($R_c$=5 mm);

at a wavelength of 1550 nanometers, the optical fiber has bending losses of less than about $8.0 \times 10^{-3}$ dB/turn for a radius of curvature of 15 millimeters ($R_c$=15 mm); and the optical fiber has a MAC value of less than 8.4.

5. The optical fiber according to claim 1, wherein:

at a wavelength of 1550 nanometers, the optical fiber has bending losses of less than about 0.2 dB/turn for a radius of curvature of 5 millimeters ($R_c$=5 mm);

at a wavelength of 1550 nanometers, the optical fiber has bending losses of less than about $7.0 \times 10^{-4}$ dB/turn for a radius of curvature of 15 millimeters ($R_c$=15 mm); and the optical fiber has a MAC value of less than 7.5.

6. The optical fiber according to claim 1, wherein:

at a wavelength of 1550 nanometers, the optical fiber has bending losses of less than about 0.1 dB/turn for a radius of curvature of 5 millimeters ($R_c$=5 mm);

at a wavelength of 1550 nanometers, the optical fiber has bending losses of less than about $1.0 \times 10^{-5}$ dB/turn for a radius of curvature of 15 millimeters ($R_c$=15 mm); and the optical fiber has a MAC value of less than 7.

7. The optical fiber according to claim 1, wherein:

at a wavelength of 1550 nanometers, the optical fiber has bending losses of less than about 0.02 dB/turn for a radius of curvature of 5 millimeters ($R_c$=5 mm); and at a wavelength of 1550 nanometers, the optical fiber has bending losses of less than about $3.0 \times 10^{-7}$ dB/turn for a radius of curvature of 15 millimeters ($R_c$=15 mm).

8. The optical fiber according to claim 1, wherein the optical fiber has a zero dispersion wavelength ($\Lambda_0$) of between 1300 nanometers and 1324 nanometers.

9. The optical fiber according to claim 1, wherein, at the zero dispersion wavelength, the optical fiber has a chromatic dispersion slope of 0.092 ps/(nm²·km) or less.

10. The optical fiber according to claim 1, wherein the optical fiber has a cable cut-off wavelength ($\Lambda_{cc}$) of 1260 nanometers or less.

11. The optical fiber according to claim 1, wherein, at a wavelength of 1310 nanometers, the optical fiber has a mode field diameter ($2W_{02}$) of 8.6 microns and 9.5 microns, with a tolerance of +/−0.6 micron.

12. The optical fiber according to claim 1, wherein $r_h \geq 0.6r_1$.

13. The optical fiber according to claim 1, wherein $r_h \geq 0.7r_1$.

14. The optical fiber according to claim 1, wherein $r_h \leq 0.9r_1$.

15. The optical fiber according to claim 1, wherein 11 μm $\leq \Lambda \leq$ 15 μm.

16. The optical fiber according to claim 1, wherein the optical fiber satisfies the criteria of the ITU-T G.652 recommendations.

17. The optical fiber according to claim 1, wherein the optical fiber satisfies the criteria of the ITU-T G.657B recommendations.

18. A cable containing one or more optical fibers according to claim 1.

19. An optical fiber, comprising:
a central core having a refractive index $n_1$ and a radius $r_1$ of between about 3.2 microns and 4.5 microns;
an optical cladding surrounding said central core, said optical cladding having a refractive index $n_2$ such that 0.31% < ((n₁−n₂)÷n₂) < 0.55%;
wherein said optical cladding defines exactly five, six, seven, or eight distinct holes that extend along the optical fiber's length, each said hole (i) having a radius $r_h$ such that $0.5r_1 \leq r_h \leq r_1$ and (ii) positioned between 9 microns and 17 microns from the central core as measured from the center of the central core to the center of each said hole;
wherein said holes in said optical cladding are substantially positioned in a single ring (i) equidistantly from said central core and (ii) circumferentially equidistantly around said central core;
wherein the optical fiber has a zero dispersion wavelength ($\Lambda_0$) of between 1300 nanometers and 1324 nanometers;
wherein, at the zero dispersion wavelength, the optical fiber has a chromatic dispersion slope of 0.092 ps/(nm²·km) or less;
wherein, at a wavelength of 1310 nanometers, the optical fiber has a mode field diameter ($2W_{02}$) of 10.1 microns or less;
wherein the optical fiber has an effective cut-off wavelength ($\Lambda_{Ceff}$) of 1280 nanometers or less;
wherein the optical fiber has a cable cut-off wavelength ($\Lambda_{cc}$) of 1260 nanometers or less; and
wherein the optical fiber has a MAC value of between about 6.5 and 8.5, the MAC value defined as the ratio of the optical fiber's mode field diameter ($2W_{02}$) at a wavelength of 1550 nanometers to the optical fiber's effective cut-off wavelength ($\Lambda_{ceff}$).

20. The optical fiber according to claim 19, wherein each said hole has a radius $r_h$ such that $0.6r_1 \leq r_h < r_1$.

21. The optical fiber according to claim 19, wherein each said hole has a radius $r_h$ such that $0.7r_1 \leq r_h \leq r_1$.

22. The optical fiber according to claim 19, wherein each said hole has a radius $r_h$ such that $0.5r_1 < r_h \leq 0.9r_1$.

23. The optical fiber according to claim 19, wherein each said hole is positioned between 11 microns and 15 microns from the central core as measured from the center of the central core to the center of each said hole.

24. The optical fiber according to claim 19, wherein, in accordance with the ITU-T G.657B standard, at a wavelength of 1310 nanometers, the optical fiber has a mode field diameter ($2W_{02}$) of between 6.3 microns and 9.5 microns, with a tolerance of +/−0.4 micron.

25. The optical fiber according to claim 19, wherein, in accordance with the ITU-T G.652 standard, at a wavelength of 1310 nanometers, the optical fiber has a mode field diameter ($2W_{02}$) of between 8.6 microns and 9.5 microns, with a tolerance of +/−0.6 micron.

26. The optical fiber according to claim 19, wherein:
at a wavelength of 1550 nanometers, the optical fiber has bending losses of less than about 0.5 dB/turn around a bending radius of 7.5 millimeters; and
at a wavelength of 1550 nanometers, the optical fiber has bending losses of less than about 0.1 dB/turn around a bending radius of 10 millimeters.

27. The optical fiber according to claim 19, wherein:
at a wavelength of 1550 nanometers, the optical fiber has bending losses of less than about 0.3 dB/turn around a bending radius of 5 millimeters;
at a wavelength of 1550 nanometers, the optical fiber has bending losses of less than about $4.0 \times 10^{-3}$ dB/turn around a bending radius of 15 millimeters; and
the optical fiber has a MAC value of 8.0 or less.

28. The optical fiber according to claim 19, wherein:
at a wavelength of 1550 nanometers, the optical fiber has bending losses of less than about 0.3 dB/turn around a bending radius of 5 millimeters;
at a wavelength of 1550 nanometers, the optical fiber has bending losses of less than about $7 \times 10^{-4}$ dB/turn around a bending radius of 15 millimeters; and
the optical fiber has a MAC value of 7.7 or less.

29. The optical fiber according to claim 19, wherein:
at a wavelength of 1550 nanometers, the optical fiber has bending losses of less than about 0.2 dB/turn around a bending radius of 5 millimeters;
at a wavelength of 1550 nanometers, the optical fiber has bending losses of less than about $5 \times 10^{-4}$ dB/turn around a bending radius of 15 millimeters; and
the optical fiber has a MAC value of 7.5 or less.

30. The optical fiber according to claim 19, wherein:
at a wavelength of 1550 nanometers, the optical fiber has bending losses of less than about 0.08 dB/turn around a bending radius of 5 millimeters;
at a wavelength of 1550 nanometers, the optical fiber has bending losses of less than about $1.5 \times 10^{-5}$ dB/turn around a bending radius of 15 millimeters; and
the optical fiber has a MAC value of 7.0 or less.

31. A cable containing one or more optical fibers according to claim 19.

32. An optical module or optical box receiving at least a portion of the optical fiber according to claim 19.

33. A Fiber-To-The-Home (FTTH) or a Fiber-To-The-Curb (FTTC) system comprising at least a portion of the optical fiber according to claim 19.

34. An optical fiber, comprising:
a central core having a refractive index $n_1$ and a radius $r_1$ of between about 3.2 microns and 4.5 microns;

an optical cladding surrounding said central core, said optical cladding having a refractive index $n_2$ such that $n_2 < n_1$ and $0.31\% < ((n_1-n_2) \div n_2) < 0.55\%$;

wherein said optical cladding defines exactly six distinct holes that extend along the optical fiber's length, each said hole (i) having a radius $r_h$ such that $0.6r_1 \leq r_h \leq r_1$ and (ii) positioned between 9 microns and 17 microns from the central core as measured from the center of the central core to the center of each said hole;

wherein said holes in said optical cladding are substantially positioned in a single ring (i) equidistantly from said central core and (ii) circumferentially equidistantly around said central core;

wherein the optical fiber has a zero dispersion wavelength ($\lambda_0$) of between 1300 nanometers and 1324 nanometers;

wherein, at the zero dispersion wavelength, the optical fiber has a chromatic dispersion slope of 0.092 ps/(nm²·km) or less;

wherein, at a wavelength of 1310 nanometers, the optical fiber has a mode field diameter ($2W_{02}$) of between 8.6 microns and 9.5 microns, with a tolerance of +/−0.6 micron;

wherein the optical fiber has an effective cut-off wavelength ($\lambda_{Ceff}$) of 1280 nanometers or less;

wherein the optical fiber has a cable cut-off wavelength ($\lambda_{CC}$) of 1260 nanometers or less; and wherein the optical fiber has a MAC value of between about 6.5 and 8.5, the MAC value defined as the ratio of the optical fiber's mode field diameter ($2W_{02}$) at a wavelength of 1550 nanometers to the optical fiber's effective cut-off wavelength ($\lambda_{Ceff}$).

35. The optical fiber according to claim 34, wherein $r_h \geq 0.7r_1$.

36. The optical fiber according to claim 34, wherein $r_h \leq 0.9r_1$.

37. The optical fiber according to claim 34, wherein, at a wavelength of 1550 nanometers, the optical fiber has bending losses of (i) 0.003 dB/turn or less for a radius of curvature of 15 millimeters, (ii) 0.1 dB/turn or less for a radius of curvature of 10 millimeters, and (iii) 0.5 dB/turn or less for a radius of curvature of 7.5 millimeters.

38. The optical fiber according to claim 34, wherein, at a wavelength of 1625 nanometers, the optical fiber has bending losses of (i) 0.01 dB/turn or less for a radius of curvature of 15 millimeters, (ii) 0.2 dB/turn or less for a radius of curvature of 10 millimeters, and (iii) 1.0 dB/turn or less for a radius of curvature of 7.5 millimeters.

39. A cable containing one or more optical fibers according to claim 34.

40. A Fiber-To-The-Home (FTTH) or a Fiber-To-The-Curb (FTTC) system comprising at least a portion of the optical fiber according to claim 34.

* * * * *